3,001,955
PREPARATION OF POLYURETHANE FOAM USING ARYLENEDICARBAMIC ACID ESTER CATALYST

Bernard Taub, Buffalo, N.Y., assignor to Allied Chemical Corporation, a corporation of New York
No Drawing. Filed Feb. 26, 1958, Ser. No. 717,566
6 Claims. (Cl. 260—2.5)

This invention relates to polyurethane foams and more particularly refers to a new and improved catalyst for effecting the reaction of an alkyd resin with an isocyanate for the production of cellular plastic materials.

Polyurethane foams prepared by reaction of polyisocyanates with alkyd resins are commercial products well known in the art described in "German Plastics Practice," by De Bell et al., 1946, pages 316 and 463–465 and in the literature and patent references. Conventional practice in the production of the polyurethane foams is to employ known amine catalysts such as N-methyl morpholine, dimethylcyclohexylamine and triethylamine. Unfortunately, foams produced by the use of conventional catalysts have a characteristic amine odor which is generally obnoxious to persons and depreciates the sales value and appeal of the foam product.

An object of the present invention is to provide a method for producing odorless polyurethane foams by reacting a polyester and a polyisocyanate. Another object of the invention is to provide new and novel catalysts adapted for use in the production of cellular polyurethanes by reaction of polyisocyanates with alkyd resins. Other objects and advantages will be apparent from the following description.

The new catalysts are arylenedicarbamic acid esters of the general formula:

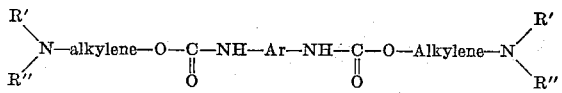

wherein R' and R" are lower alkyl radicals with from 1 to 5 carbon atoms, R' and R" together with the attached N atom form part of a heterocyclic ring, alkylene means a divalent non-cyclic saturated hydrocarbon radical having the general formula $C_nH_{2n}$, and Ar is an aromatic ring system containing at least ten nuclear carbon atoms and preferably not more than twenty nuclear carbon atoms.

Such diurethane compounds are obtained by the reaction of two mols of a monohydric amino alcohol of the general formula

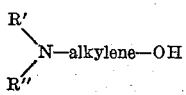

where R' and R" are lower alkyl radicals with from 1 to 5 carbon atoms, R' and R" together with the attached N atom form part of a heterocyclic ring system, alkylene means a divalent non-cyclic saturated hydrocarbon radical having the general formula $C_nH_{2n}$, with one mol of an arylene diisocyanate in which the arylene radical consists of an aromatic ring system Ar containing at least ten nuclear carbon atoms and preferably not more than twenty nuclear carbon atoms. The aromatic ring system contains two or more benzene rings, which may be fused together, e.g. naphthalene, or joined by a single bond through ring C atoms, e.g. biphenyl, or joined through a divalent radical or atom such as methylene, —O—, —S—, etc. The arylene radical Ar may contain nuclear substituents such as lower alkyl, alkoxy, halogen, or other groups that are not reactive with isocyanate groups.

For the purposes of the present invention a wide variety of monohydric alcohols having a tertiary amino group may be employed in the reaction with the arylene diisocyanate. Suitable amino alcohols are preferably those having a primary hydroxyl group such as 2-(dialkylamino)-ethanols in which the alkyl groups are methyl, ethyl, propyl, isopropyl, butyl, etc.; 2-aminoethanols in which the amino nitrogen atom is part of a heterocyclic ring system, as in piperidino-, morpholino-, pyrrolidino- compounds; and similar tertiary amino compounds derived from 3-amino-propanol, 3-amino-2-methyl-propanol, 3-amino-3-methyl-propanol, 4-aminobutanol, etc. Amino alcohols having a secondary hydroxyl group and a tertiary amino group of the type illustrated above with 2-amino-ethanols may also be utilized, such as 3-(tertiary amino)-isopropanol, 4-(tertiaryamino)-2-butanol, 4-tertiaryamino)-3-methyl-2-butanol, etc. The preferred alcohols are 2-piperidinoethanol, 2-pyrrolidinoethanol, diethylaminoethanol, dipropylaminoethanol and 4-morpholineethanol.

The organic diisocyanate employed in the preparation of these new diurethane compounds is an aromatic diisocyanate containing at least ten nuclear carbon atoms, and preferably not more than twenty carbon atoms in the ring system. Suitable diisocyanates include the following, 1,5-naphthylene diisocyanate, 4,4'-biphenylene diisocyanate, 3,3'-dimethyl-4,4'-biphenylene diisocyanate, 3,3'-dimethoxy-4,4'-biphenylene diisocyanate, 3-phenyl-4,4'-biphenylene diisocyanate, 3-chloro-4,4'-biphenylene diisocyanate, 3,3'-dichloro-4,4'-biphenylene diisocyanate, 3,3'-diethyl-4,4'-biphenylene diisocyanate, diphenylmethane-4,4'-diisocyanate, 2,2'-dimethyldiphenylmethane-4,4'-diisocyanate, diphenylether-4,4'-diisocyanate, triphenylmethane-4,4'-diisocyanate, 1,1'-dinaphthyl-2,2'-diisocyanate. The preferred organic diisocyanates are diphenylmethane-4,4'-diisocyanate, 3,3'-dimethyl-4,4'-biphenylene diisocyanate and 1,5-naphthylene diisocyanate.

The reaction of the arylene diisocyanate with the amino alcohol is preferably carried out in the presence of an inert organic solvent such as diethyl ether or benzene. To avoid loss of diisocyanate and to avoid the formation of contaminants such as ureas, the solvent should be anhydrous. By virtue of their two tertiary amino groups the novel arylenedicarbamic acid esters can readily be converted to acid addition salts, e.g. acetate, hydrochlorides and phosphates, or quaternary ammonium salts, e.g. methiodides, which are water soluble. The organic acid addition salts, e.g. acetates, may be employed as catalysts per se. The inorganic acid addition salts, such as the hydrochlorides, are preferably used in conjunction with an inorganic base, which will generate at least part of the free diurethane base. When no water as such is added, a hydrated inorganic base, e.g.

$$Na_2CO_3 \cdot 10H_2O$$

is employed, which will release water when the mixture is heated.

The foams may be prepared in the usual manner by admixing and introducing into a mold the components composed of a polyester, diisocyanate, water in the presence of a small amount, about 0.5–10% preferably 1–3% based on the weight of polyester, of the new arylenedicarbamic acid ester as catalyst. Ordinarily the polyisocyanate being admixed is in an amount of at least 20%, preferably 40–80% by weight of the polyester. The water should be in an amount enough to react with the isocyanate to liberate sufficient gas to produce a foam of the desired physical characteristics. From 0.5 to 10% water based on the weight of isocyanate will generally give good results. The more water used, in general, the lower the density of the foam. The mixing of the constituents may be carried out at an elevated temperature or under atmospheric conditions.

In the preparation of polyurethane foams it is desirable to employ a dispersing agent, desirably a non-ionic dispersing agent, to assist in the intimate mixing of the reactants.

The preferred emulsifiers are of the non-ionic type, such as a monoether of a polyethylene glycol with an alkyl phenol, blends of poly alcohol carboxylic acid esters and oil soluble sulfonate ("Witco 77"), polyethylene glycol ricinoleate ("Emulphor EL-719"), sorbitan monolaurate ("Span 20"), and poloxy alkylene derivatives of sorbitan monolaurate (e.g. "Tween 20" and "Tween 80"). Anionic emulsifiers such as sodium dioctyl sulfosuccinate may also be used. In general the amount of emulsifier required does not exceed 10% based on the polyester.

Prepolymers may be prepared by first reacting the diisocyanate with the polyester in the absence of water to form a prepolymer. In the preparation of polyurethane foam, the new arylenedicarbamic acid ester catalyst and dispersing agent may first be dissolved in water and this solution added to the prepolymer, preferably at room temperature, and the resultant mixture agitated vigorously for a short time, less than a minute, and then poured into a mold. Foaming will start immediately. The rate of foaming may be increased considerably by heating the prepolymer prior to addition of catalyst mixture.

The polyester may be linear or branched chain and is derived from polycarboxylic organic acids and polyhydric alcohols. Suitable linear polyesters are those prepared by the reaction of dicarboxylic organic acids such as adipic, fumaric, maleic, malic, phthalic, sebacic with polyhydric alcohols such as ethylene glycol, diethylene glycol, propylene glycol, glycerol and trimethylolpropane.

Suitable polyisocyanates include hexamethylene diisocyanate, cyclohexyl-1,4-diisocyanate, tolylene diisocyanates, diphenylmethane-4,4'-diisocyanate, substituted diphenyl methane-4,4'-diisocyanates, naphthalene diisocyanates and others. The amount of polyisocyanate used should be such that there is an excess of isocyanate groups over the reactive hydrogen atoms contained in the polyester so as to react completely with the polyester. To accomplish this the polyisocyanate should be generally used in an amount of at least 20% by weight of the polyester.

The following examples illustrate the present invention, in which parts given are by weight.

Example 1

To 12.5 parts diphenylmethane-4,4'-diisocyanate dissolved in 100 parts anhydrous diethyl ether there is added dropwise over half an hour, with constant agitation a solution of 12.9 parts 2-piperidinoethanol in 100 parts anhydrous diethyl ether. The addition is completed in half an hour and the reaction mixture is then warmed to reflux temperature for a period of six hours. The solvent is removed by distillation and the resulting diurethane is recrystallized from hot carbon tetrachloride in 85% yield. This compound has a melting point of 125° C. and has the formula

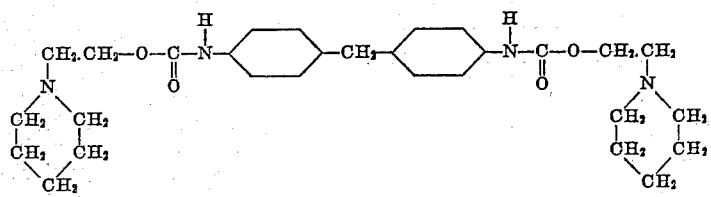

The water soluble dihydrochloride may be obtained by treating an anhydrous ethyl acetate solution of the diurethane with anhydrous hydrogen chloride gas.

Example 2

In the process of Example 1 in place of 2-piperidinoethanol there is used an ether solution of 13.1 parts of 4-morpholineethanol whereby the corresponding bis-morpholinoethyl diurethane is produced. It has the formula

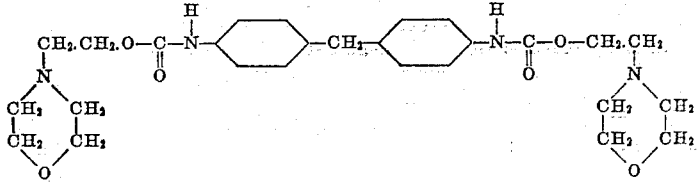

and can be converted to the water soluble dihydrochloride salt by treatment with anhydrous hydrogen chloride gas.

Example 3

In the process of Example 1 there is used an ether solution (100 parts ether) of 11.5 parts of 2-pyrrolidinoethanol to react with the diphenylmethane-4,4'-diisocyanate. The product has the formula:

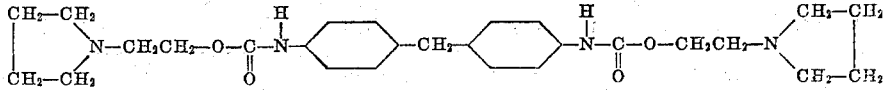

Example 4

13.2 parts of 3,3'-dimethyl-4,4'-biphenylene diisocyanate are dissolved in 100 parts anhydrous diethyl ether and stirred vigorously during a dropwise addition (half an hour) of a solution of 11.7 parts of diethylaminoethanol in 100 parts anhydrous ether. The reaction mixture is refluxed for six hours and the solvent removed by distillation to give a crystalline product (96% yield). The diurethane recrystallized from carbon tetrachloride has a melting point of 95°, and analyzes.

|   | Found | Calc. |
|---|---|---|
| C | 67.32 | 67.47 |
| H | 8.41 | 8.88 |
| N | 10.95 | 11.25 |

It corresponds with the formula:

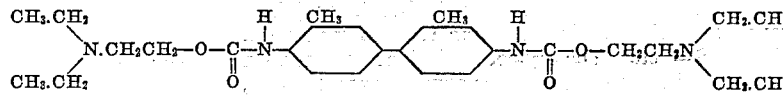

It can be dissolved in a suitable anhydrous solvent for conversion to the dihydrochloride salt.

Example 5

In the process of Example 4 there is used an ether solution (100 parts ether) of 14.5 parts of dipropylaminoethanol to react with 13.2 parts of 3,3'-dimethyl-4,4'-biphenylene diisocyanate. The recrystallized base has a melting point of 82–3° and analyzes N of 10.11% (calc. N=10.15%) corresponding to the formula:

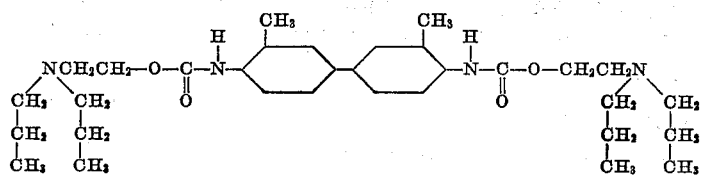

Example 6

In the process of Example 4 the ether solution of diethylaminoethanol may be replaced by a solution of 13.1 parts of 4-morpholineethanol in 100 parts ether and the corresponding bis-morpholinoethyl diurethane is obtained in high yield. The base has a melting point of 164–5° and analyzes

|   | Found | Calc. |
|---|---|---|
| C | 63.83 | 63.88 |
| H | 7.17 | 7.22 |

It corresponds to the formula:

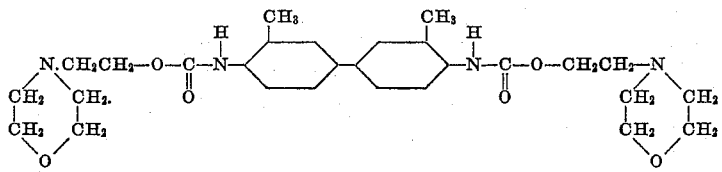

Example 7

In the process of Example 4 there may be used an ether solution (100 parts anhydrous ether) of 12.9 parts of 2-piperidinoethanol to react with 13.2 parts of 3,3'-dimethyl-4,4'-biphenylene diisocyanate. The diurethane base has a melting point of 250° and analyzes

|   | Found | Calc. |
|---|---|---|
| C | 68.80 | 68.97 |
| H | 8.10 | 8.05 |
| N | 10.61 | 10.73 | corresponding to the formula

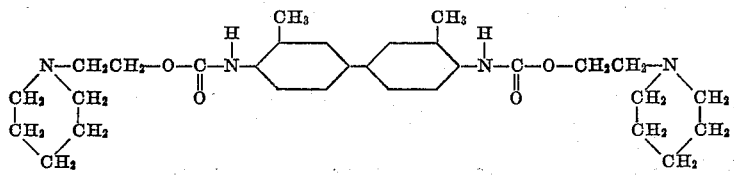

The resulting diurethane may be converted to the water soluble hydrochloride salt.

Example 8

In the process of Example 4 the diethylaminoethanol is replaced by 11.5 parts of 2-pyrrolidinoethanol to produce the corresponding bis-pyrrolidinoethyl diurethane having a melting point of 138–140° and the formula

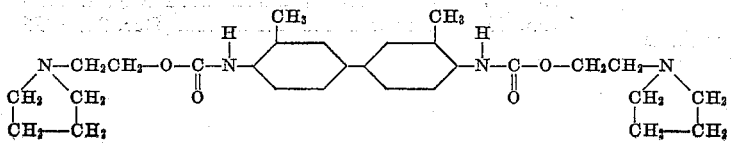

Example 9

100 parts linear polyester ("Paraplex U–148," diethylene glycol adipate, hydroxyl number 55–65), 2.5 parts water, 1.0 part emulsifying agent ("Witco 77–86," blend of poly alcohol carboxylic acid esters and oil soluble sulfonates) and 2.0 parts of catalyst (the diurethane base prepared as in Example 4 above), were mixed with high speed agitation. Then 39 parts by weight of tolylene diisocyanate (80% 2,4-isomer and 20% 2,6-isomer) were added. The resulting mixture was agitated for 15–20 seconds and poured into a mold open at its top. The time required for the foam to reach the top of the mold was 4½ minutes. The foam structure was essentially completely maintained until a permanent "set" foam was produced. The resultant polyurethane foam was odorless, i.e. devoid of the characteristic amine odor of conventional amine catalyst.

Example 10

The conditions of operation in this example were the same as in Example 9 except that the catalyst employed was the bismorpholinoethyl diurethane base prepared as in Example 2 above. The principal difference was in the time required for the foam to attain maximum height, 3⅙ minutes as compared to 4½ minutes when employing the catalyst of Example 9. The polyurethane foam of Example 10, like that of Example 9, was odorless.

For purposes of comparison a control test was run in which the conditions were the same as Example 9 except that no catalyst was employed. In the control experiment using no catalyst the time required for the foam to reach the top of the mold was appreciably longer, 10 minutes, and the foam collapsed soon after rising.

Although certain preferred embodiments of the invention have been disclosed for purpose of illustration, it will be evident that various changes and modifications may be made therein without departing from the scope and spirit of the invention.

I claim:
1. In a process for the production of polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

R'\N—Alkylene—O—C—NH—Ar—NH—C—O—Alkylene—N/R'
R"/         ||                    ||           \R"
            O                     O wherein

R'\N—
R"/ is selected from the class in which R' and R" are lower alkyl radicals with from 1 to 5 carbon atoms, and a heterocyclic group in which R' and R" together with the attached N atom form part of a heterocyclic ring, alkylene means a divalent non-cyclic saturated hydrocarbon radical having the general formula $C_nH_{2n}$ in which $n$ represents an integer greater than 1 and less than 5, and Ar is an aromatic ring system containing at least ten nuclear carbon atoms and not more than twenty nuclear carbon atoms.

2. In a process for the production of polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

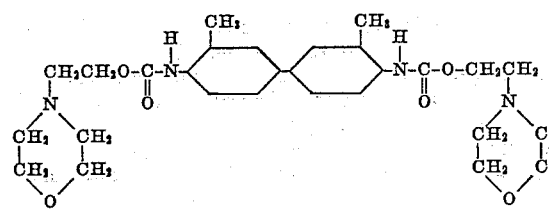

3. In a process for the production of polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

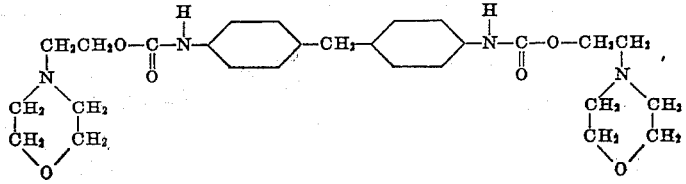

4. In a process for the production of polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

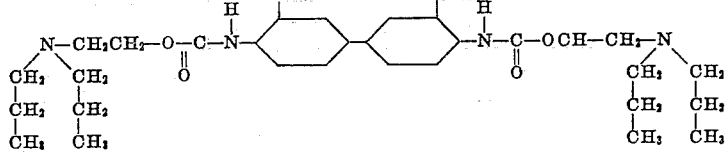

5. In a process for the production polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

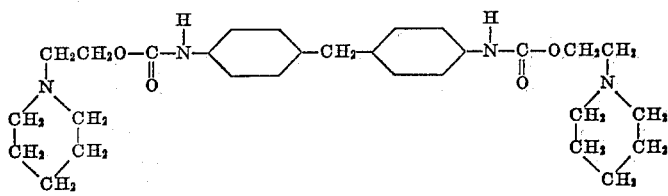

6. In a process for the production of polyurethane foams involving the reaction of a polyester prepared from polycarboxylic organic acids and polyhydric alcohols and an organic polyisocyanate in an amount of at least 20% by weight of the polyester, and water, the improvement which comprises effecting said reaction in the presence of an arylenedicarbamic acid ester catalyst of the formula:

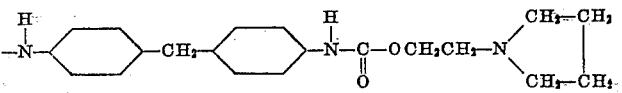

References Cited in the file of this patent

UNITED STATES PATENTS

| 2,683,728 | Mastin et al. | July 13, 1954 |
| 2,877,192 | Burkus | Mar. 10, 1959 |
| 2,878,279 | Schmid et al. | Mar. 17, 1959 |

FOREIGN PATENTS

| 754,502 | Great Britain | Aug. 8, 1956 |
| 1,135,863 | France | Dec. 22, 1956 |